United States Patent
Corson et al.

(10) Patent No.: US 10,013,062 B1
(45) Date of Patent: Jul. 3, 2018

(54) FLUID-ACTUATED HAPTIC FEEDBACK JAMMING DEVICE FOR MOVEMENT RESTRICTION IN HAPTIC DEVICES

(71) Applicant: Oculus VR, LLC, Menlo Park, CA (US)

(72) Inventors: Nicholas Roy Corson, Mukilteo, WA (US); Sean Jason Keller, Kirkland, WA (US); Tristan Thomas Trutna, Seattle, WA (US); Charles Stewart, Bothell, WA (US); Raymond King, Redmond, WA (US)

(73) Assignee: Oculus VR, LLC, Menlo Park, CA (US)

( * ) Notice: Subject to any disclaimer, the term of this patent is extended or adjusted under 35 U.S.C. 154(b) by 0 days.

(21) Appl. No.: 15/619,287

(22) Filed: Jun. 9, 2017

(51) Int. Cl.
*F15B 15/10* (2006.01)
*G06F 3/01* (2006.01)

(52) U.S. Cl.
CPC .............. *G06F 3/016* (2013.01); *F15B 15/10* (2013.01); *G06F 3/014* (2013.01)

(58) Field of Classification Search
CPC ........... G06F 3/016; G06F 3/014; F15B 15/10
See application file for complete search history.

(56) References Cited

U.S. PATENT DOCUMENTS

| 8,989,902 | B1* | 3/2015 | Crawford | B25J 3/04 |
| | | | | 700/257 |
| 9,937,839 | B2* | 4/2018 | Nahman | B60N 2/72 |
| 2008/0167662 | A1* | 7/2008 | Kurtz | A61B 34/70 |
| | | | | 606/130 |
| 2016/0185309 | A1* | 6/2016 | Di Censo | B60R 16/037 |
| | | | | 701/49 |
| 2017/0185152 | A1* | 6/2017 | Keller | G06F 3/016 |

* cited by examiner

*Primary Examiner* — Ricardo L Osorio
(74) *Attorney, Agent, or Firm* — Fenwick & West LLP

(57) ABSTRACT

A sheet jammer device comprises a first jamming sheet having a first surface within a compression region. A first inflatable bladder includes a first contact area within the compression region and a second jamming sheet has a surface within the compression. A second inflatable bladder that includes a second contact area that is within the compression region. An amount of inflation of the first inflatable bladder and the second inflatable bladder controls the first friction force and the second friction force to restrict movement of the first jamming sheet relative to the second jamming sheet.

20 Claims, 8 Drawing Sheets

FLUID-ACTUATED HAPTIC FEEDBACK JAMMING DEVICE FOR MOVEMENT RESTRICTION IN HAPTIC DEVICES

BACKGROUND

The present disclosure generally relates to a system for haptic feedback to a user, and specifically a fluid-actuated haptic feedback jamming device for movement restriction in haptic devices.

Virtual reality (VR) is a simulated environment created by computer technology, and augmented reality (AR) is a live direct or indirect view of a physical, real-world environment whose elements are augmented (or supplemented) by computer technology. VR or AR can be presented to a user through a VR/AR system. Typically, a VR/AR system includes a VR/AR headset that provides visual and audio information to the user. Conventional VR/AR systems create virtual body parts (e.g., a virtual hand) in the simulated environment and use a tracking system to track a user movement in a physical space. The simulated environment presented to the user may be updated according to the user movement in the physical space. However, such systems generally do not prevent or control the user movement in the physical space, as the user is in contact with virtual objects in the simulated environment. As a result, the environment in the VR/AR space is not replicated in the real physical space in regards to a user's physical sensations.

SUMMARY

A sheet jammer device is described. The sheet jammer device comprises a first jamming sheet having a first surface and a second surface opposite the first surface, and a portion of the first surface within a compression region. The first jamming sheet is also anchored to a haptic device. The device also comprises a first inflatable bladder that includes a first contact area within the compression region, with the first contact area is adjacent to the portion of the first surface within the compression region. The first contact area is configured to exert a first friction force against the portion of the first surface that is adjacent to the first contact area.

The device includes a second jamming sheet that has a third surface and a fourth surface opposite the third surface. The portion of the third surface is within the compression region and is adjacent to a portion of the second surface of the first jamming sheet within the compression area, and the second jamming sheet is anchored to the haptic device.

A second inflatable bladder is also a part of the device. The second inflatable bladder includes a second contact area that is adjacent to a portion the fourth surface of the second jamming sheet within the compression region, with the second contact area configured to exert a second friction force against the portion of the fourth surface that is adjacent to the second contact area.

An amount of inflation of the first inflatable bladder and the second inflatable bladder controls the first friction force and the second friction force to restrict movement of the first jamming sheet relative to the second jamming sheet.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Configuration Overview

Embodiments relate to a system and a method for providing haptic feedback to a user by adjusting, via a sheet jammer haptic feedback assembly, the physical movement of a portion of the user's finger. The adjusting of the physical movement is in response to a virtual position of the portion of the user in a VR space, an AR space, a mixed reality (MR) space, or some combination thereof. The virtual position corresponds to a physical position of the portion of the user.

The sheet jammer is used to restrict the movement of a user (e.g., a user's finger). The sheet jammer includes at least two jamming sheets that at least partially overlap, with brake calipers or a brake mechanism, such as inflatable bladders, positioned at the overlapping sections and surrounding the jamming sheets. When the inflatable bladders are not inflated, the jamming sheets can move freely over each other, particularly along a longitudinal direction. Upon inflation of the bladders, the jamming sheets are forced against each other, causing a friction force to be exerted upon each jamming sheet. This prevents the jamming sheets from moving against each other. The jamming sheets are anchored at their non-overlapping areas to a haptic glove body, e.g., lengthwise within the finger enclosure of said glove body. Thus, the actuation of the bladders allows a haptic feedback system to restrict or enable the movement of the user's finger within the glove. Additional details regarding the sheet jammer haptic structure are described below.

Overview of Sheet Jammer

Figure 1:
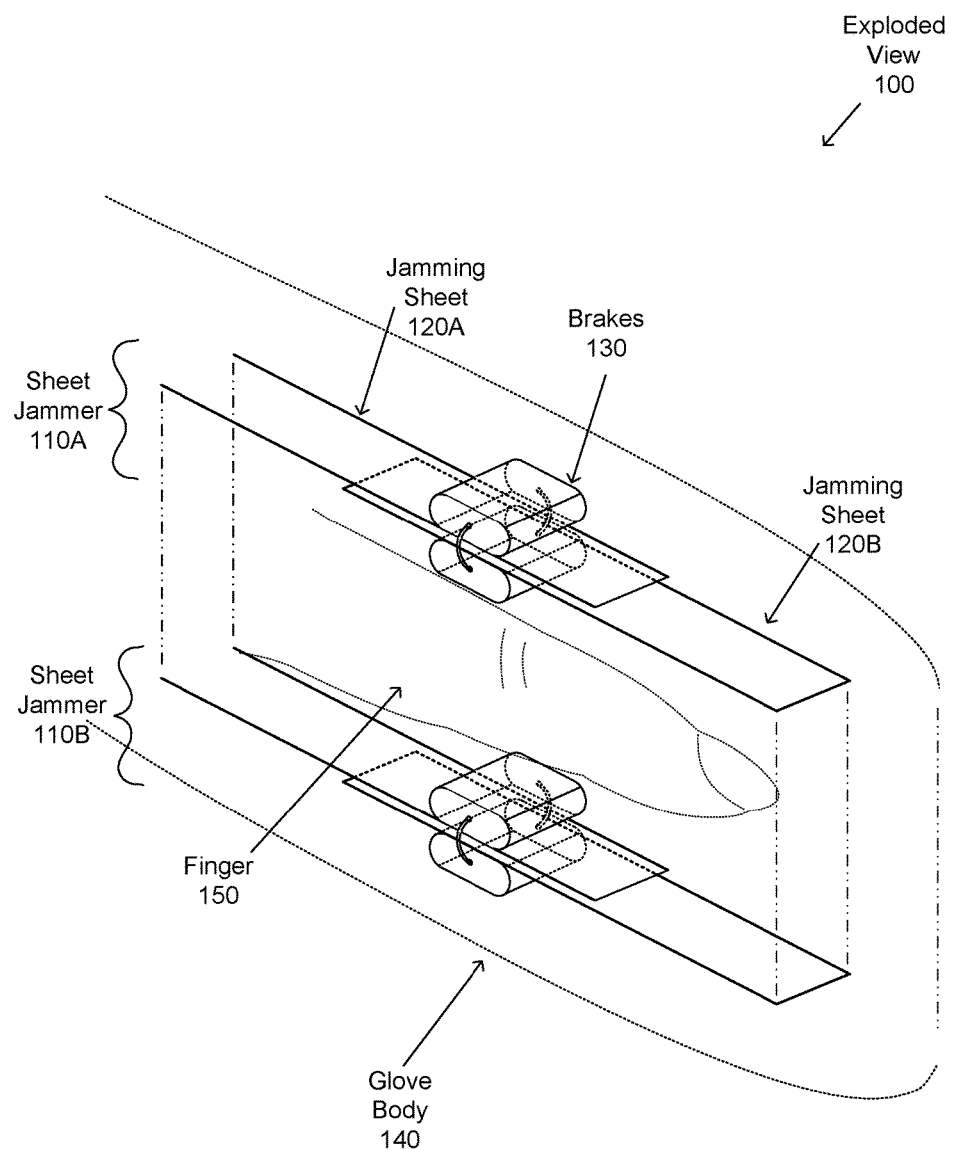
FIG. 1 is an exploded view of sheet jammer haptic feedback assemblies (hereinafter referred to as "sheet jammers") within a finger unit of a glove body, in accordance with an embodiment.

FIG. 1 is an exploded view 100 of sheet jammer haptic feedback assemblies 110A-B (hereinafter referred to as "sheet jammers") within a finger unit of a glove body 140, in accordance with an embodiment. Although a particular orientation, dimensions, components, and other configurations of the sheet jammers 110A, 110B are shown in FIG. 1, in other embodiments the sheet jammers 110A, 110B may be different in these and other aspects. For example, in one embodiment, each finger of the glove body 140 includes only one sheet jammer (e.g., sheet jammer 110A or 110B).

The sheet jammers 110A, 110B may be used in a finger unit of a glove body 140, which is illustrated by the dashed lines in FIG. 1. The finger unit of the glove body 140 encloses a finger 150 of a user when the glove body 140 is worn by the user. The glove body 140 can be part of a larger system, which may include VR components, MR components, AR components, or some combination thereof. The finger unit includes a dorsal surface and a palmer surface. The finger unit additionally includes two lateral surfaces connected to the dorsal surface and the palmer surface of the finger unit. The sheet jammer may be positioned on either the dorsal surface or the palmer surface. Furthermore, more than one sheet jammers may surround the finger longitudinally as shown.

Each sheet jammer 110A, 110B includes one or more jamming sheets, such as the jamming sheets 120A-B of the sheet jammer 110A. The jamming sheets are shaped to have a length that exceed a multiple of the width (e.g. the length is greater than twice the width), and with a thickness smaller than the width, as shown. The jamming sheets can be seen as long and thin strips. In one embodiment, the entire sheet jammer (e.g., 110A) is 35 mm in length and 10 mm in width, with each jamming sheet (e.g., 120A, 120B) exceeds half the total length of the sheet jammer (e.g., 110A).

Each jamming sheet is anchored to the glove body 140 (not shown) at opposite ends of the sheet jammer. For example, the anchors could be at the tip of the finger of the glove body 140 and at the base of the finger of the glove body 140. Each jamming sheet (e.g., 120A) may be made of any combination of materials, such as fabrics (cotton or nylon), polymers (silicon), meshes, metallic materials, and so on, chosen for being able to generate a certain friction force, for weight requirements, manufacturing costs, thickness, and so on. Each jamming sheet is designed to be inelastic (i.e., not significantly elastic). In one embodiment, the jamming sheets are made of KAPTON (a polymide). In one embodiment, the KAPTON material has a static coefficient of friction ($\mu s$) of at least 0.34 and a kinetic coefficient of friction ($\mu k$) of 0.29. However, in other embodiments, the coefficients of friction are different (in such a case, the force from the brakes 130 may be varied to achieve a desired total force). Each jamming sheet may have a minimum amount of structural rigidity such that it resists bending along the same plane of the jamming sheet but is flexible along a direction normal to the plane of the jamming sheet (as will be shown in FIG. 2).

The jamming sheets 120A, 120B overlap with each other at least for a portion of their length, and are anchored at their non-overlapping ends. Placed above (and below) this overlapping region are brakes. Looking at jamming sheet 120A, brakes 130 are placed above and below an overlapping region of the jamming sheets 120A and 120B, creating a compression region between the brakes. The compression region includes portions of each of the jamming sheets 120A and 120B. In a resting state, the jamming sheets 120A, 120B do not make contact with each other, or any contact between the jamming sheets 120A, 120B does not inhibit their relative movement (due to the coefficient of friction between the two jamming sheets being sufficiently low). However, when the brakes 130 are activated, they compress against each other to cause the jamming sheets 120A, 120B to come into contact with each other to a degree such that the relative movement between the jamming sheets is inhibited. In particular, the sheet jammer 110A may no longer extend in length. Additionally, the bending stiffness of each jamming sheet may change when the brakes 130 are activated. As the jamming sheets 120A, 120B are anchored against the glove body 140, this in turn inhibits the movement of the glove body 140, and the user's finger 150 within the glove body 140, such that the finger 150 can no longer freely extend (i.e., bend). As two sheet jammers 110A, 110B are present, this allows movement restriction in different directions (e.g., both in the bending and extension directions of the user's finger).

Although two jamming sheets are shown here for each sheet jammer 110A, B, in other embodiments each sheet jammer 110A, B, may have more than two jamming sheets (e.g., 15-20 jamming sheets). These multiple jamming sheets may be variously anchored to either end of the sheet jammer (e.g., sheet jammer 110A, B), and in one embodiment, the location of the anchor for each jamming sheet may be alternated for each jamming sheet versus its adjacent jamming sheets.

In one embodiment, surfaces of the brakes 130, or at least surfaces facing the jamming sheets 120A, 120B, includes friction material (e.g., rubber, felt, grooved surfaces, etc.), so that when the brakes 130 contact the jamming sheets 120A, 120B, the friction material assists in preventing the jamming sheets 120A, 120B from moving. In one embodiment, the surface of the jamming sheets 120A, 120B that are facing the brakes 130 includes additional friction material.

The brakes 130 may be any type of device capable of being used as calipers to create a friction force, e.g., rubber brakes, felt brakes, vices, calipers, etc. In one embodiment, the brakes 130 are inflatable bladders, placed at one or both sides of the set of jamming sheets 120A, 120B (i.e., above and below the jamming sheets). Each inflatable bladder is inflated or deflated using a fluid (e.g., a gas or liquid) which may be delivered using a pump, fluid transfer device, or other actuator attached to the sheet jammer 110A or at another location on the glove body 140 or elsewhere (via a flexible hose or other delivery mechanism). Each inflatable bladder may be made of a flexible material that is elastic or inelastic, such as a polymer, fabric, or so on (e.g., KAPTON), chosen for being able to generate a certain friction force on its surface in response to a certain inflation pressure, for weight requirements, manufacturing costs, and so on. Each inflatable bladder is made of a material that is impervious to the fluid that is used within the inflatable bladder. The multiple inflatable bladders may be fluidically coupled to each other, such that fluid from one inflatable bladder freely flows to the other bladder. The inflatable bladders may be shaped as oblong cylinders (as shown).

Once inflated, the inflatable bladder makes contact with the jamming sheets 120A, 120B. This causes the jamming sheets 120A, 120B to compress against each other and the jamming sheets 120A, 120B. This compression force causes any shear movement between the jamming sheets 120 to be reduced or eliminated. This in turn restricts the movement of the finger unit of the glove body 140 to which the jamming sheets 120A, 120B are anchored, and thus cases a restriction in movement of the finger 150 of the user who is wearing the glove body 150.

In one embodiment, the inflatable bladders have a defined contact area with the jamming sheets 120A, 120B of sufficient size to exert a desired force due to the static friction from inflation. This contact area is the area which contacts the jamming sheets 120A, 120B when the inflatable bladders are inflated and exerts a friction force against the jamming sheets 120A, 120B. The inflatable bladders may be designed such that the contact area facing the jamming sheet 120A or 120B does not change in surface area significantly in response to inflation or deflation. In one embodiment, when inflated, the inflatable bladders for each sheet jammer 110A and 110B are inflated to 15 PSI of operating pressure and generate 5 N of static friction. In one embodiment, the area of each inflatable bladder is at least 10 mm by 10 mm (100 mm²), resulting in a total contact area between the two inflatable bladders and the two jamming sheets 120A, 120B of at least 4×100 mm². This contact area size and static friction generated may be for each inflatable bladder for the entire set of inflatable bladders that comprise the brakes 130. In one embodiment, to compute the friction force generated, the following equation may be used:

$$F_F = \mu \cdot n \cdot P \cdot l \cdot w \tag{1}$$

Here, $F_F$ represents the friction force, is the coefficient of friction (static or kinetic), n is the number of layers (i.e., number of brake and jamming sheet layers, with each brake and jamming sheet counting as a layer), P is the inflatable bladder pressure, l is the length of the area of contact, and w is the width of the area of contact.

Using the values described above as an example (where $\mu_s=0.34$), the static friction force would be 0.34×4×100 kN/m²×10 mm×10 mm=13.6 N. Using the kinetic coefficient of force value (i.e., $\mu_k=0.29$), the friction force due to kinetic friction would be 11.6 N. Using this formula, a minimum brake contact area requirement may be computed based on the coefficient of friction of the inflatable bladders and the desired target force requirement. For example, if the target force requirement is 5 N, using the above formula, the minimum contact area needed under static friction would be 0.000147 m². If four layers are used as in the illustrated example, this means that a 6 mm×6 mm contact area for the brake is the minimal area needed, and is sufficient to achieve the desired target force. Thus, the selected 10 mm×10 mm area is sufficient to achieve the desired force.

Using the system as described here presents various advantages. The method allows for the fluid pump or actuator to be separated from the haptic mechanism of the sheet jammer 110A or 110B such that the bulky pump or motor does not need to be located at the user's finger. The sheet jammers 110A, 110B can be located at the finger unit of the glove body 140, while the fluid pump may be located in a less space-constrained area. Furthermore, as noted above, as multiple layers are used, a relatively small brake contact area is needed to achieve a desired target force. This means that the sheet jammers 110A, 110B can be compact in size and not obstruct the user's finger movement when it is not activated. Furthermore, as the pressure applied by the inflatable bladders can be varied, a variable target force and thus a varied amount of movement restriction can be achieved by the sheet jammers 110A, 110B.

Additional details regarding the sheet jammers (e.g., 110A, 110B) are described below with reference to FIGS. 2-8.

Operation of Sheet Jammers

Figure 2:
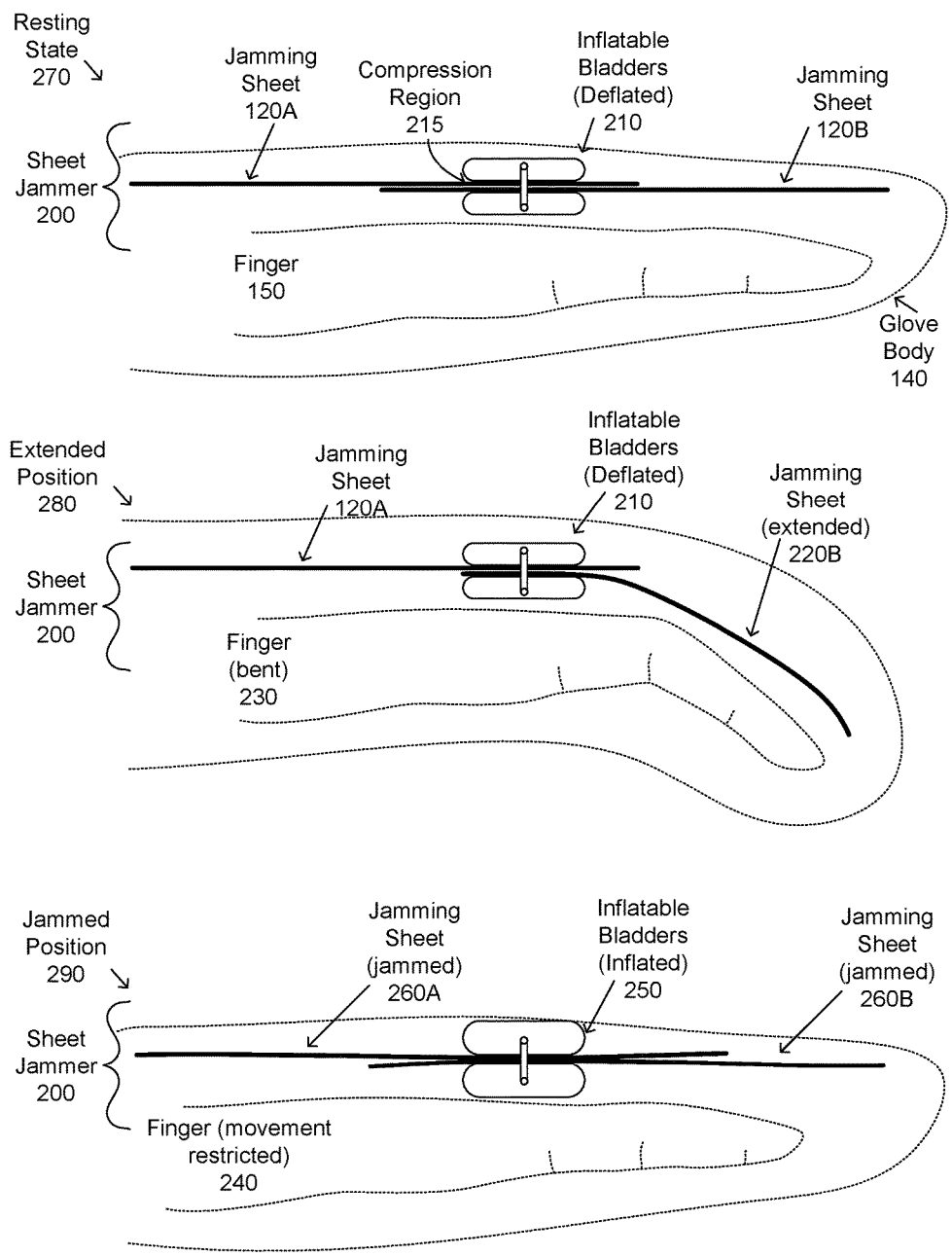
FIG. 2 illustrates the operation of a sheet jammer through a resting state, an extended position, and a jammed position, according to an embodiment.

FIG. 2 illustrates the operation of a sheet jammer 200 through a resting state, an extended position, and a jammed position, according to an embodiment. The sheet jammer 200 is an embodiment of the sheet jammers described above with regard to FIG. 1.

In a resting state 270 (shown at the top of the figure), inflatable bladders 210 are deflated. The inflatable bladders 210 are an embodiment of the brakes (e.g., brakes 130) described above with regard to FIG. 1. In-between the inflatable bladders is a compression region 215. This compression region 215 includes a portion of the jamming sheet 120A and a portion of the jamming sheet 120B as shown. The deflated inflatable bladders 210 do not compress the jamming sheets 120A, 120B within the compression region 215, and thus the jamming sheets 120A, 120B are not restricted, and the finger 150 can freely move without restriction while in the glove body 140. The free movement of the fingers is shown by extended position 280 (shown in the middle of the figure), in which the finger 150 is bent as the bent finger 230. Since the finger 230 is bent, this extends the finger unit of the glove body 140, which in turn causes the jamming sheets to move, as they are anchored to the glove body.

As shown in the extended position 280, the jamming sheet 120B is extended to become the extended jamming sheet 220B. The extended jamming sheet 220B extends by moving forward along with the bent finger 230. When moving forward, the extended jamming sheet 220B slides against the jamming sheet 120A. However, as noted above, the friction between the two jamming sheets 120A and 120B is minimal, and thus the extended jamming sheet 220B, while sliding forward, does not encounter significant resistance from the jamming sheet 120A. Furthermore, as the inflatable bladders 210 are deflated, they also do not restrict the extended jamming sheet 220B from moving. Thus, the finger 230 is free to bend within the glove body 140.

In contrast, in the jammed position 290 (shown at the bottom of the figure), the inflatable bladders are inflated as inflatable bladders 250. This causes a braking action against the jamming sheets and causes the jamming sheets to be in a jammed position as the jammed jamming sheets 260A-B. The jammed jamming sheets 260 are jammed because the inflated inflatable bladders 250 press against the jammed jamming sheets 260, causing the jammed jamming sheets 260 to compress against each other. This in turn causes the friction between the inflated inflatable bladders 250 and the jammed jamming sheets 260A, 260B to generate a force (e.g., the target force) which restricts the movement of the jammed jamming sheets 260A, 260B against each other. Thus, in contrast to the free movement of the jamming sheets 120A, 120B as described in the extended position 280, in the jammed position 290 the jammed jamming sheets 260A, 260B are jammed and are completely or partially restricted from movement relative to each other. Whether movement is completely or partially restricted depends upon the amount of force exerted by the inflated inflatable bladders 250, which in turn is correlated to the fluid pressure of the fluid provided to the inflatable bladders 250. The movement restriction of the jammed jamming sheets 260A, 260B restricts the movement of the finger unit of the glove body 140, which in turn causes the user's finger to be in a movement restricted state. The movement restricted finger 240 is unable to move (completely or partially), and thus a haptic movement restriction effect is generated.

Note that while inflatable bladders are illustrated in the figure, in other embodiments a different brake mechanism is used in place of the inflatable bladders. For example, hydraulically actuated or motorized brake calipers may be used instead, so long as their contact area and other characteristics of these alternative brakes are able to generate the target force required. The operation of such alternative brakes may function similarly to the inflatable bladders described here. Additionally, while only a single sheet jammer per finger was illustrated here for the purposes of clarity, each finger may have more than one sheet jammer, as previously shown. Each sheet jammer would restrict movement in a direction opposite to the position of the sheet jammer relative to the finger (e.g., a sheet jammer located below the finger would restrict an upwards bending movement of the finger). Furthermore, although two jamming sheets and two inflatable bladders are shown per sheet jammer, in other embodiments a fewer or greater number of jamming sheets and inflatable bladders may be used.

Anchoring Methods for Sheet Jammers

Figure 3A:
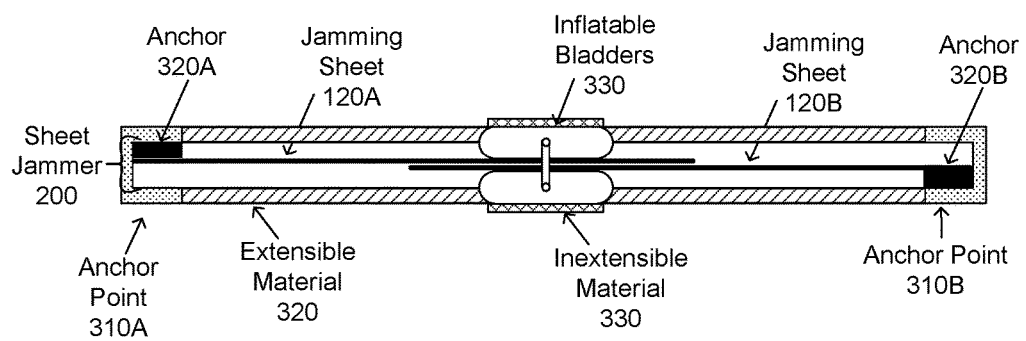
FIG. 3A illustrates anchoring structure for anchoring a sheet jammer to a glove body, according to an embodiment.

FIG. 3A illustrates anchoring structure for anchoring a sheet jammer 200 (e.g., 110A) to a glove body (e.g., 140), according to an embodiment. While previously the structure of the sheet jammer 200 itself was described, FIG. 3A describes a method of anchoring the sheet jammer 200 to the glove body.

As illustrated, the sheet jammer 200 is anchored to the glove body via anchors 320A and 320B, each anchor at opposite sides of the sheet jammer 200, and each anchor attaching one of the jamming sheets 120A, 120B of the sheet jammer 200 to the glove body. The anchors 320A, 320B are respectively attached to anchor points 310A-B, which may be part of the glove body. The attachment between the anchors 320A, 320B and anchor points 310A, 310B may be via stitching, other mechanical bond, a chemical bond, or an adhesive bond. These anchor points 310A, 310B are regions of the glove body to which the anchors 320A, 320B attach. Although the anchor 320A is shown to attach the jamming sheet 120A to the top of the anchor point 310A and the anchor 320B is shown to attach the jamming sheet 120B to the bottom of the anchor point 310B, in other embodiments the anchors 320A, 320B may be oriented differently (e.g., both anchors attach to the top (or bottom) of the anchor points). The anchor points 310A, 3210B may be structurally rigid components of the glove body. The anchor points 310A, 3210B may be located at opposite ends of a finger unit of the glove body. As the sheet jammer 200 is anchored to these anchor points 310A, 310B, the sheet jammer 200 can restrict the movement of the entire finger unit in this fashion.

Further surrounding the sheet jammer 200 may be both extensible material 320 and inextensible material 330. Layers of inextensible material 330 are attached to and extend along the outside surfaces of the inflatable bladders 330 (i.e., the brakes). The attachment may be via stitching, other mechanical bond, chemical bonding, or via an adhesive. A layer of extensible material 320 is attached (using similar means) to each of the ends of the two inflatable bladders 330, and extends from each bladder to an anchor point 310A, 310B as shown. The inextensible material 330 may comprise flexible but inelastic material, such as an inelastic fabric, polymer, or other similar materials. The extensible material 320 may comprise a flexible and elastic material, such as an elastic fabric, polymer, elastic mesh, and other similar materials. The extensible material 320 is selected such that its elasticity (i.e., modulus) is sufficient so that it can extend from the resting state 270 of the sheet jammer 200 (as shown in FIG. 2) to a fully extended position of the sheet jammer 200 (e.g., where the finger is fully curled in the case where the sheet jammer 200 is above the finger). However, the extensible material 320 itself should not necessarily offer any resistance of its own which can be sensed by the user, and may only have enough resistive force to be able to return back to a non-extended state.

This entire enclosure of the sheet jammer 200 as shown in FIG. 3 may be placed either above or below the user's finger in a finger unit of the glove body. Note that the structure here is not necessarily drawn to scale. Instead, in practice, the entire structure may be relatively thin (e.g., less than 1 cm in thickness) such that it does not significantly increase the thickness or size of the glove body.

Figure 3B:
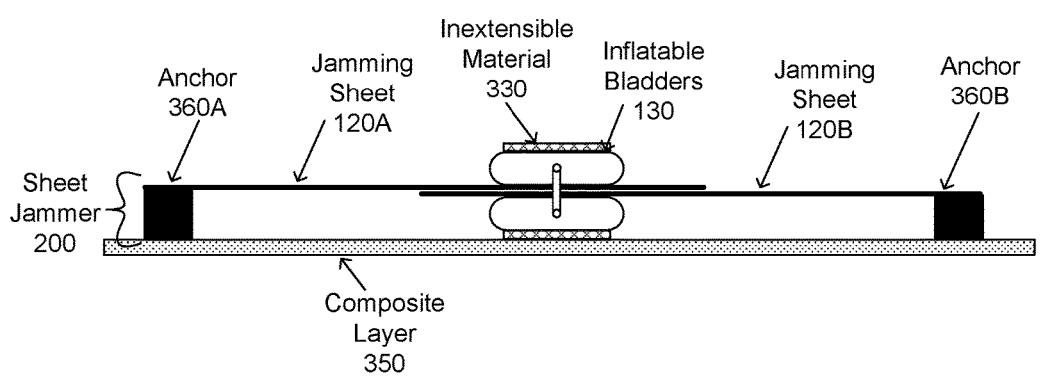
FIG. 3B illustrates an alternative anchoring structure for a sheet jammer, according to an embodiment.

FIG. 3B illustrates an alternative anchoring structure for a sheet jammer 200, according to an embodiment. In contrast to the anchoring structure of FIG. 3A, the anchoring structure of FIG. 3B does not surround the sheet jammer 200, but primarily resides on one side of the sheet jammer 200, as shown.

Similar to the anchoring mechanism in FIG. 3A, a layer of inextensible material 330 is attached to the outside of the inflatable bladders 330. This prevents the inflatable bladders 330 from stretching (extending). However, instead of having the extensible material 320, a composite layer 350 (e.g., a silicon fabric composite layer) is attached to the inextensible material 330 layer and extends to at least the ends of the sheet jammer 200. At the ends of the sheet jammer 200, anchors 360A and 360B anchor the ends of the sheet jammer 200 to the composite layer 350, similar to the anchors 320A and 320B. The anchors 360A, 360B may be composed of the same material as the anchors 320A, 320B. The composite layer 350 may form part of a glove body (e.g., 140), and may be attached to additional points on a finger unit of the glove body to allow the sheet jammer 200 to restrict the movement of the user's finger.

Depending on where the sheet jammer 200 is located with respect to the user's finger, the orientation of the composite layer 350 may change. For example, if the sheet jammer 200 is located above the finger, the composite layer 350 may be oriented above the sheet jammer 200 itself so that the composite layer 350 can be attached to the wall of the finger unit of the glove body.

Alternative Embodiments for Sheet Jammers

Figure 4:
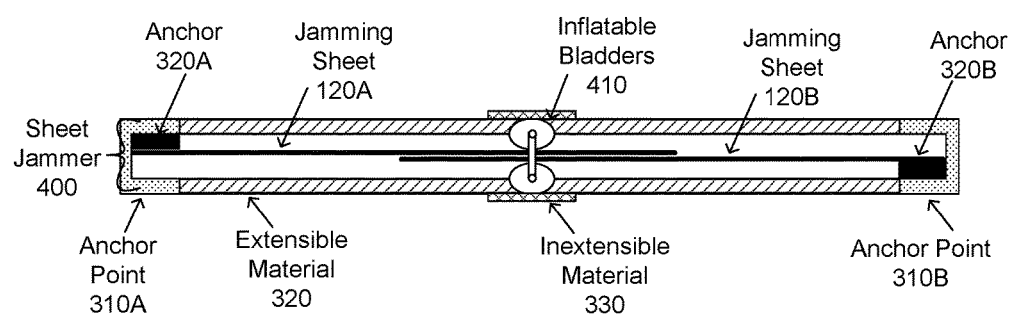
FIG. 4 illustrates an embodiment of a sheet jammer using an alternative brake structure, according to an embodiment.

FIG. 4 illustrates an embodiment of a sheet jammer 400 using an alternative brake structure, according to an embodiment. Instead of an oblong cylindrically shaped inflatable bladder used as a brake for the sheet jammer 200 as shown above, in other embodiments the brakes may be shaped differently. For example, as illustrated, the inflatable bladders 410 used as brakes are elliptical cylinders in shape. The height of each elliptical cylinder may be equal to the width of each jamming sheet 120A, 120B. When inflated, these inflatable bladders 410 may become circular in shape. This may be advantageous as it allows the inflatable bladders 410 to rotate.

If the rotational velocity of the inflatable bladders 410 (i.e., their spin) is controlled while they are inflated, the shear movement of the jamming sheets 120 can be controlled precisely as the rotation of the inflatable bladders 410 allows for a corresponding movement in the corresponding jamming sheets 120A, 120B. For example, a counterclockwise motion in the bottom inflatable bladder 410 allows for a movement to the right for the jamming sheet 120B as shown. This allows the sheet jammer 400 to precisely control the amount of movement restriction provided by the sheet jammer 400.

This functionality may further allow the sheet jammer 400 to elongate and contract the length of the sheet jammer 400 independently of the movement of the user's finger in a glove body (e.g., 140) to which the sheet jammer 400 is anchored, instead of simply restricting movement. This may allow for additional haptic feedback modalities wherein the sheet jammer 400 is able to induce a movement in the user's finger in response to some AR or VR stimulus. For example, if the user's finger impacts an object in the VR environment, the sheet jammer 400 maybe able to rotate the inflatable bladders 410 to induce a movement in the finger unit of the glove body to which the sheet jammer 400 is anchored, inducing a corresponding motion in the user's finger. Two sheet jammers 400 may operate in tandem, each sheet jammer 400 on opposite sides of the user's finger and anchored to the glove body, in order to induce the movement, with one sheet jammer 400 extending and the other contracting.

In one embodiment, the rotational movement of the inflatable bladders 410 is achieved via special internal structures inside the inflatable bladders 410 such that when fluid is pumped in the inflatable bladders 410, this causes the inflatable bladders 410 to rotate. For example, a connector may be coupled to the inflatable bladder 410 using a bearing joint or other connector that allows for the inflatable bladder 410 to freely rotate about an axis. When fluid is pumped into the inflatable bladder 410 via this connector, the fluid exerts a force against various components that are arranged such that the inflatable bladder 410 rotates in response. For example, the components may include a structure that is arranged in the shape of a screw. When fluid is forced against the screw structure, it rotates and causes the inflatable bladder to rotate as well.

Figure 5:
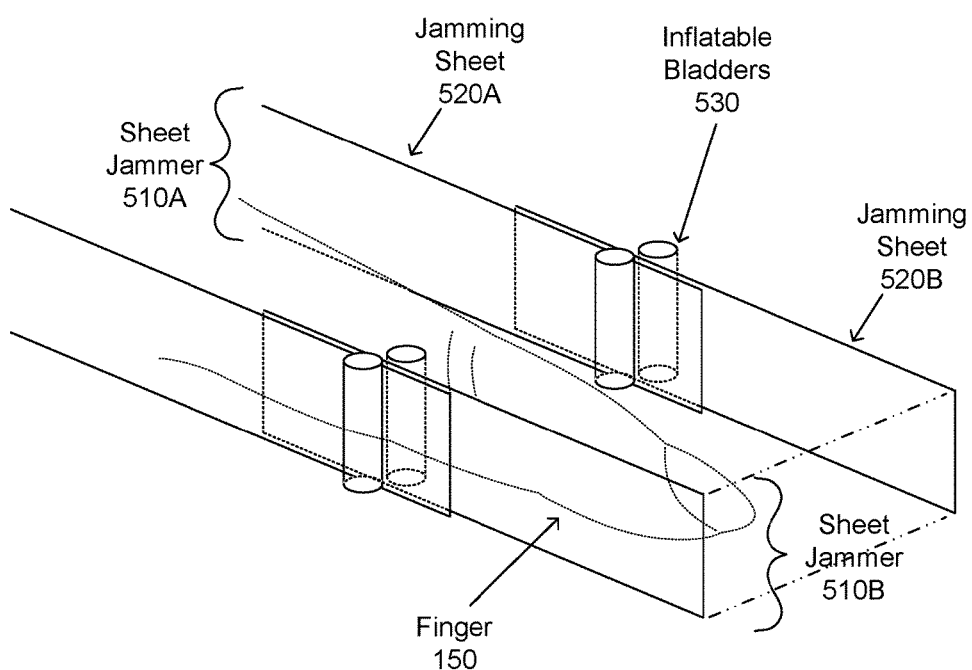
FIG. 5 illustrates an alternative orientation of sheet jammers in a glove body, according to an embodiment.

FIG. 5 illustrates an alternative orientation of sheet jammers 510A, 510B in a glove body (e.g., 140), according to an embodiment. Instead of orienting the sheet jammers 110A, 110B on the palmer and/or dorsal surfaces of the finger unit of the glove body as shown in FIG. 1, the alternative orientation in FIG. 5 shows the sheet jammers 510A, 510B positioned along the lateral surfaces of the finger unit. In other words, instead of orienting the sheet jammers longitudinally along the finger and above and/or below the plane of rotation of the user's finger, the sheet jammers 510A, 510B are oriented laterally to the finger and orthogonally to the plane of rotation of the user's finger, although still longitudinally along the finger's length.

In this scenario, when the user bends his or her finger, it causes the jamming sheets in the sheet jammers 510A, 510B to rotate against each other. However, by activating the inflatable bladders 530 (or brakes), the movement of the jamming sheets (e.g., 520A, 520B) against each other is restricted, and the user cannot bend his or her finger (or is significantly restricted from doing so). The sheet jammers (e.g., 520A, 530B) may be similarly anchored to the glove body, as described previously in FIG. 3-4.

Haptic Device Illustration

Figure 6:
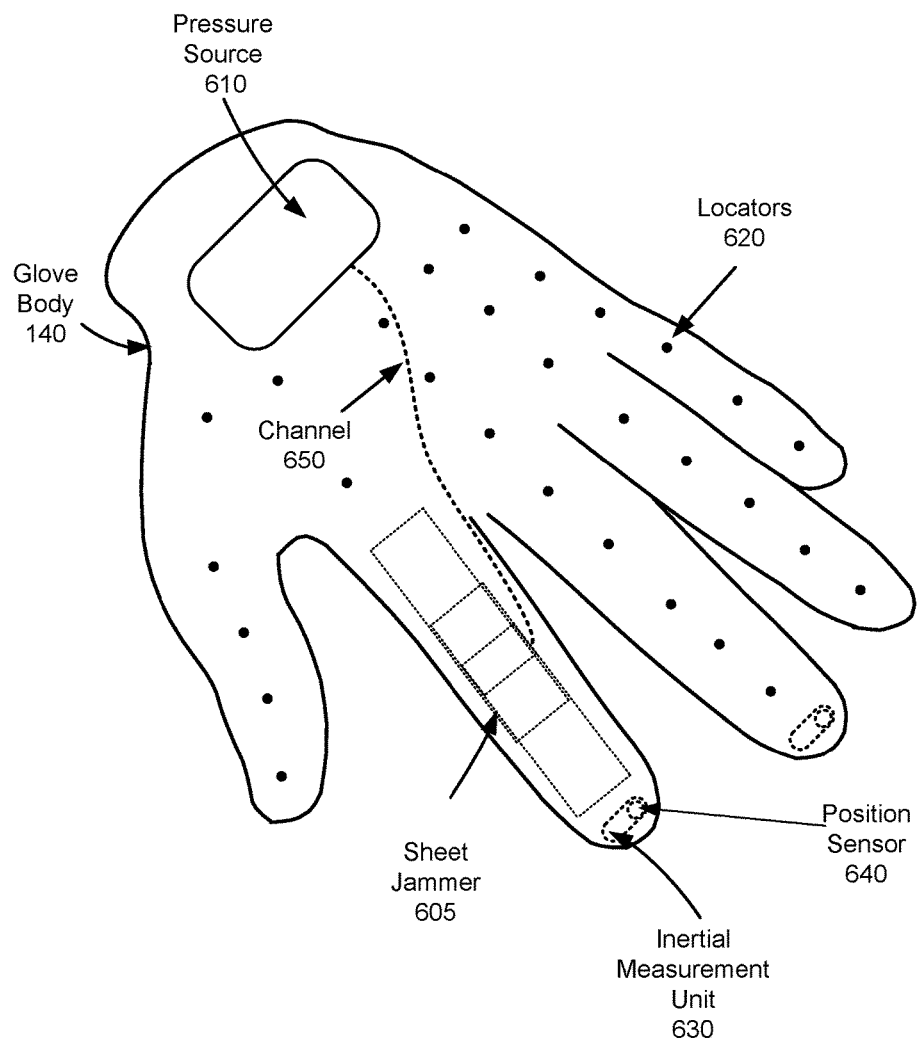
FIG. 6 is a perspective view of a haptic device, in accordance with an embodiment.

FIG. 6 is a perspective view of a haptic device, in accordance with an embodiment. The haptic device includes the glove body 140, a sheet jammer 605, a pressure source 610, and a channel 650. Additionally, in some embodiments, the haptic device may also include locators 620, a position sensor 640, and an inertial measurement unit (IMU) 630.

The glove body 140 is an apparatus covering a hand. The glove body 140 is a garment that is coupled to the position sensor 640, the sheet jammer 605, the pressure source 610, and the channel 650 (e.g., a tube). In one embodiment, the position sensor 640 is coupled to a corresponding finger of the glove body 140 (e.g., at a portion corresponding to a fingertip); the sheet jammer 110 is coupled to a corresponding finger portion (e.g., a portion corresponding to one or more joints between two phalanges) of the glove body 140; and the pressure source 610 is coupled to a portion of the glove body 140 corresponding to a back of a hand (i.e., dorsal side). The channel 650 is coupled between the pressure source 610 and the sheet jammer 605. In one embodiment, one or more of these components are placed beneath an outer surface layer of the glove body 140, thus are not visible from the outside. Additionally or alternatively, some of these components are placed on an outer surface layer of the glove body 140, and are visually detectable.

The glove body 140 illustrated in FIG. 6 is merely an example, and in different embodiments, the glove body 140 includes fewer, more or different components than shown in FIG. 6. For example, in other embodiments, there can be multiple sheet jammers 605 (e.g., one or more on each finger) and multiple channels 650. In addition, in other embodiments, there may be multiple position sensors 640 provided. Also, in one or more embodiments, one or more sheet jammers 605 and the pressure source 610 can be positioned in different places than shown in FIG. 6. For example, additional sheet jammers and the position sensors 640 are located at different parts of the glove body 140. For another example, the pressure source 610 is coupled to a different portion of the glove body 140 corresponding to, for example a wrist or a palm. Alternatively, the pressure source 610 may be located external to the glove body 140, in which case a detachable coupling may connect the pressure source 610 to the sheet jammers 605.

The locators 620 are objects located in specific positions on the glove body 140 relative to one another. Additional details regarding the configuration and operation of the locators 620 are described with regards to FIG. 7.

The position sensor 640 generates one or more measurement signals in response to motion of the haptic glove 600. Additional details regarding the configuration and operation of the position sensor 640 are described with regards FIG. 7.

The IMU 630 is an electronic device that generates fast calibration data based on measurement signals received from one or more of the position sensors 640. Based on the one or more measurement signals from one or more position sensors 640, the IMU 630 generates fast calibration data indicating an estimated position of the glove body 140 relative to an initial position of the glove body 140. Additional details regarding the configuration and operation of the IMU 630 are described with regards FIG. 7.

The sheet jammer 605 is an embodiment of the sheet jammer described above with regard to FIG. 1. The sheet jammer 605 (represented by the dashed lines) restricts the movement of a user's finger, e.g., for the purposes of haptic feedback. In one embodiment, the sheet jammer 605 is actuated according to pressure applied from the pressure source 610. The pressure applied from the pressure source 610 may transmit fluid to one or more of the inflatable bladders of the sheet jammer 605. These inflatable bladders may be, e.g., the brakes 130 of FIG. 1. The sheet jammer 605 may cover one or more joints between phalanges of a user's finger when enclosed by the glove body 140. In another embodiment, several sheet jammers are placed on other parts of the glove body 140, such as on other fingers, each coupled to one or more pressure sources via one or more channels.

The pressure source 610 modulates the sheet jammer 605 by adjusting a pressure of the fluid in the inflatable bladders of the sheet jammer 605. The pressure source 610 adjusts the pressure of the inflatable bladders of the sheet jammer 110 by injecting (or ejecting) fluid via a channel to the sheet jammer. In the case of multiple sheet jammers, the pressure source 610 may have a gate or valve for each channel leading to each sheet jammer 605, and can control the inflation or deflation of inflatable bladders at each sheet jammer 605.

In some embodiments, the pressure source 610 receives a haptic feedback signal from a console (e.g., as described below with reference to FIG. 7), and actuates the sheet jammer 605 accordingly. The pressure source 610 applies pressure to the inflatable bladders of the sheet jammer 605 based on the haptic feedback signal. In one embodiment, the haptic feedback signal identifies a sheet jammer 605 to inflate or deflate and an amount of actuation (or amount of pressure) to be applied, and the pressure source 605 applies pressure to the inflatable bladders of the sheet jammer 605 as identified by the haptic feedback signal.

Exemplary System

Figure 7:
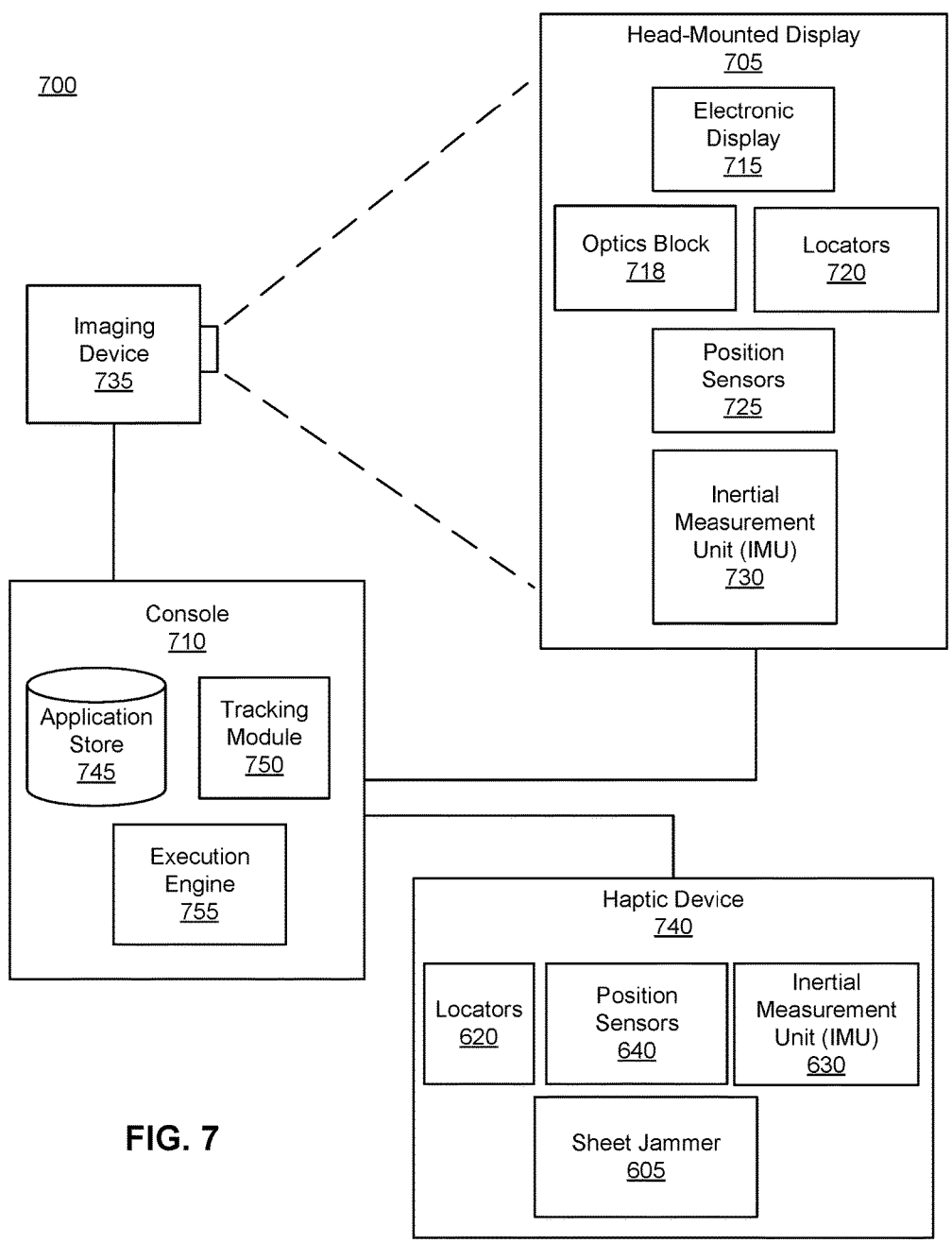
FIG. 7 is a block diagram of a system in which a console and a haptic device operate, in accordance with an embodiment.

FIG. 7 is a block diagram of a system 700 in which a console 710 and a haptic device 740 operate, in accordance with an embodiment. The system 700 may operate in a VR environment, an AR environment, a MR environment, or some combination thereof. The system 700 shown by FIG. 7 comprises a head-mounted display (HMD) 705 (also referred to as "a headset 705"), an imaging device 735, and a haptic device 740, such as the haptic device described with reference to FIG. 6. While FIG. 7 shows an example system 700 including one HMD 705, one imaging device 735, and one haptic device 740, in other embodiments any number of these components may be included in the system 700. For example, there may be multiple HMDs 705 each having an associated haptic device 740 and being monitored by one or more imaging devices 735, with each HMD 705, haptic device 740, and imaging devices 735 communicating with the console 710. In alternative configurations, different and/or additional components may be included in the system environment 700. Similarly, the functions can be distributed among the components in a different manner than is described here. For example, some or all of the functionality of the console 710 may be contained within the HMD 705.

The HMD 705 is a head-mounted display that presents media to a user. Examples of media presented by the HMD 705 include one or more images, video, audio, or any combination thereof. In some embodiments, audio is presented via an external device (e.g., speakers and/or headphones) that receives audio information from the HMD 705, the console 710, or both, and presents audio data based on the audio information. The HMD 705 may augment views of a physical, real-world environment with computer-generated elements (e.g., images, video, sound, etc.).

The HMD 705 includes an electronic display 715, an optics block 718, one or more locators 720, one or more position sensors 725, and an inertial measurement unit (IMU) 730. The electronic display 715 may be an electronic display panel as described previously. It may be a type of liquid crystal display (LCD) or other display technology capable of displaying images and/or video. The electronic display 715 displays images (to the user) in accordance with data received from the console 710. These images may include the VID test patterns described earlier, or any image generated by the console 710, such as one of the images or video streams in a stereoscopic video set.

The optics block 718 magnifies received light from the electronic display 715, and corrects optical errors associated with the image light. The corrected image light is presented to a user of the HMD 705. An optical element may be an aperture, a Fresnel lens, a convex lens, a concave lens, a filter, or any other suitable optical element that affects the image light emitted from the electronic display 715. Moreover, the optics block 718 may include combinations of different optical elements. In some embodiments, one or more of the optical elements in the optics block 718 may have one or more coatings, such as anti-reflective coatings.

The locators 720 are objects located in specific positions on the HMD 705 relative to one another and relative to a specific reference point of the HMD 705 on the HMD 705. A locator 720 may be a light emitting diode (LED), a corner cube reflector, a reflective marker, a laser emitter, a type of light source that contrasts with an environment in which the HMD 705 operates, or some combination thereof. In embodiments where the locators 720 are active (i.e., an LED or other type of light emitting device), the locators 720 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators 720 are located beneath an outer surface layer of the HMD 705, which is transparent to the wavelengths of light emitted or reflected by the locators 720 or is thin enough not to substantially attenuate the wavelengths of light emitted or reflected by the locators 720. Additionally, in some embodiments, the outer surface or other portions of the HMD 705 are opaque to wavelengths of electromagnetic radiation in the visible spectrum. Thus, the locators 720 may emit light in the IR band under an outer surface that is transparent in the IR band but opaque in the visible band.

The IMU 730 is an electronic device that generates fast calibration data (herein also referred to as "fast calibration information") of the HMD 705 based on measurement signals received from one or more of the position sensors 725. A position sensor 725 generates one or more measurement signals in response to motion of the HMD 705. Examples of position sensors 725 include: one or more accelerometers, one or more gyroscopes, one or more barometers, one or more magnetometers, another suitable type of sensor that detects motion, a type of sensor used for error correction of the IMU 730, or some combination thereof. The position sensors 725 may be located external to the IMU 730, internal to the IMU 730, or some combination thereof.

Based on the one or more measurement signals from one or more position sensors 725, the IMU 730 generates fast calibration data of the HMD 705 indicating an estimated position of the HMD 705 relative to an initial position of the HMD 705. For example, the position sensors 725 include multiple accelerometers to measure translational motion (forward/back, up/down, left/right) and multiple gyroscopes to measure rotational motion (e.g., pitch, yaw, and roll) of the HMD 705. In some embodiments, the IMU 730 rapidly samples the measurement signals and calculates the estimated position of the HMD 705 from the sampled data. For example, the IMU 730 integrates the measurement signals received from the accelerometers over time to estimate a velocity vector and integrates the velocity vector over time to determine an estimated position of a reference point of the HMD 705 on the HMD 705. Alternatively, the IMU 730 provides the sampled measurement signals to the console 710, which determines the fast calibration data of the HMD 705. The reference point of the HMD 705 is a point that may be used to describe the position of the HMD 705. While the reference point of the HMD 705 may generally be defined as a point in space; however, in practice the reference point of the HMD 705 is defined as a point within the HMD 705 (e.g., a center of the IMU 730).

The IMU 730 receives one or more calibration parameters of the HMD 705 from the console 710. As further discussed below, the one or more calibration parameters of the HMD 705 are used to maintain tracking of the HMD 705. Based on a received calibration parameter of the HMD 705, the IMU 730 may adjust one or more IMU parameters (e.g., sample rate). In some embodiments, certain calibration parameters of the HMD 705 cause the IMU 730 to update an initial position of the reference point of the HMD 705 so it corresponds to a next calibrated position of the reference point of the HMD 705. Updating the initial position of the reference point of the HMD 705 as the next calibrated position of the reference point of the HMD 705 helps reduce accumulated error associated with the determined estimated position. The accumulated error, also referred to as drift error, causes the estimated position of the reference point of the HMD 705 to "drift" away from the actual position of the reference point of the HMD 705 over time.

The haptic device 740 is an apparatus for providing haptic feedback to the user. The haptic device 740 may include locators 620, one or more position sensors 640, and an inertial measurement unit (IMU) 630, and the sheet jammer 605. In some embodiments, the locators 620, one or more position sensors 640, an inertial measurement unit (IMU) 630 are employed to determine a physical position or movement of the haptic device 740. In addition, the haptic device 740 receives, from the console 710, a haptic feedback signal corresponding to haptic feedback to the user. The haptic device 740 provides to the user the haptic feedback of touching a virtual object in a virtual space, according to the haptic feedback signal. Specifically, the haptic device 740 provides an amount of resistance to a physical movement of a portion of a user in contact with the virtual object in the virtual space. This may be accomplished using the sheet jammer 605.

In one embodiment, the amount of resistance may vary depending on a hardness of the virtual object and force (e.g., measured based on velocity or acceleration) applied by the user. If force applied by the user finger is determined to be insufficient (for example, force is less than the hardness value or a threshold value) to break or deform the virtual object (e.g., rock), the haptic device 740 prevents a physical movement of the user finger to move in a direction through the virtual object in the virtual space. To accomplish this, the inflatable bladders of the sheet jammer 605 of the haptic device may be inflated to a certain degree to cause the sheet jammer 605 to restrict the physical movement of the user's finger.

In one example, if force applied by the user finger is determined to be larger than the hardness of the virtual object to break or penetrate the virtual object (e.g., egg), the haptic device 740 can provide no resistance to allow the user movement through the virtual object. In another example, if force applied by the user finger is determined to be larger than the hardness of the virtual object to deform the virtual object (e.g., rubber ball), the haptic device 740 can provide an amount of resistance to slow down the physical movement to simulate the deformation. Accordingly, the user can receive a perception of contacting the virtual object. These simulated forces may be achieved by varying the pressure of fluid transmitted to the inflatable bladders of the sheet jammer 605.

In one embodiment, the haptic feedback signal indicates a position or a portion of the sheet jammer 605 to be actuated, and an amount of actuation of the position or the portion of the sheet jammer 605 for providing haptic feedback. In this embodiment, the amount of actuation is determined by, e.g., the console 710, according to a virtual position of the sheet jammer 605 corresponding to a physical position of the sheet jammer 605 and a virtual position of a virtual object in a virtual space. The sheet jammer 605 provides tactile perception of a user touching the virtual object according to the amount of actuation indicated by the haptic feedback signal.

The locators 620 are objects located in specific positions on the haptic device 740 relative to one another and relative to a specific reference point of the haptic device 740 on the haptic device 740. A locator 620 is substantially similar to a locator 720 except that a locator 620 is part of the haptic device 740. Additionally, in some embodiments, the outer surface or other portions of the haptic device 740 are opaque in the visible band of wavelengths of light. Thus, the locators 620 may emit light in the IR band under an outer surface that is transparent in the IR band but opaque in the visible band.

A position sensor 640 generates one or more measurement signals in response to motion of the haptic device 740. The position sensors 640 are substantially similar to the positions sensors 725, except that the position sensors 640 are part of the haptic device 740. The position sensors 640 may be located external to the IMU 630, internal to the IMU 630, or some combination thereof.

Based on the one or more measurement signals from one or more position sensors 640, the IMU 630 generates fast calibration data of the haptic device 740 indicating an estimated position of the haptic device 740 relative to an initial position of the haptic device 740. For example, the position sensors 640 include multiple accelerometers to measure translational motion (forward/back, up/down, left/right) and multiple gyroscopes to measure rotational motion (e.g., pitch, yaw, and roll) of the haptic device 740. In some embodiments, the IMU 630 rapidly samples the measurement signals and calculates the estimated position of the haptic device 740 from the sampled data. For example, the IMU 630 integrates the measurement signals received from the accelerometers over time to estimate a velocity vector and integrates the velocity vector over time to determine an estimated position of a reference point of the haptic device 740. Alternatively, the IMU 630 provides the sampled measurement signals to the console 710, which determines the fast calibration data of the haptic device 740. The reference point of the haptic device 740 is a point that may be used to describe the position of the haptic device 740. While the reference point of the haptic device 740 may generally be defined as a point in space; however, in practice the reference point of the haptic device 740 is defined as a point within the haptic device 740 (e.g., a center of the IMU 630).

The IMU 630 receives one or more calibration parameters of the haptic device 740 from the console 710. As further discussed below, the one or more calibration parameters of the haptic device 740 are used to maintain tracking of the haptic device 740. Based on a received calibration parameter of the haptic device 740, the IMU 630 may adjust one or more IMU parameters (e.g., sample rate). In some embodiments, certain calibration parameters of the haptic device 740 cause the IMU 630 to update an initial position of the reference point of the haptic device 740 so it corresponds to a next calibrated position of the reference point of the haptic device 740. Updating the initial position of the reference point of the haptic device 740 as the next calibrated position of the reference point of the haptic device 740 helps reduce accumulated error associated with the determined estimated position.

The imaging device 735 generates slow calibration data in accordance with calibration parameters received from the console 710. Slow calibration data (herein also referred to as "slow calibration information") of the VR/AR headset includes one or more images showing observed positions of the locators 720 associated with the HMD 705 that are detectable by the imaging device 735. Similarly, slow calibration data of the haptic device 740 includes one or more images showing observed positions of the locators 620 associated with the haptic device 740 that are detectable by the imaging device 735. In one aspect, the slow calibration data includes one or more images of both the HMD 705 and haptic device 740. The imaging device 735 may include one or more cameras, one or more video cameras, and any other device capable of capturing images including one or more of the locators 720 and 620, or any combination thereof. Additionally, the imaging device 735 may include one or more filters (e.g., used to increase signal to noise ratio). The imaging device 735 is configured to detect light emitted or reflected from locators 720 and 620 in a field of view of the imaging device 735. In embodiments where the locators 720 and 620 include passive elements (e.g., a retroreflector), the imaging device 735 may include a light source that illuminates some or all of the locators 720 and 620, which retro-reflect the light towards the light source in the imaging device 735. Slow calibration data is communicated from the imaging device 735 to the console 710, and the imaging device 735 receives one or more calibration parameters from the console 710 to adjust one or more imaging parameters (e.g., focal length, focus, frame rate, ISO, sensor temperature, shutter speed, aperture, etc.).

The console 710 provides media to the HMD 705 for presentation to the user in accordance with information received from one or more of: the imaging device 735, the HMD 705, and the haptic device 740. The console 710 may also instruct the haptic device 740 to provide haptic feedback including a perception of a user contacting a virtual object. In the example shown in FIG. 1, the console 710 includes an application store 745, a tracking module 750, and an execution engine 755. Some embodiments of the console 710 have different modules than those described in conjunction with FIG. 7. Similarly, the functions further described below may be distributed among components of the console 710 in a different manner than is described here.

The application store 745 stores one or more applications for execution by the console 710. An application is a group of instructions, that when executed by a processor, generates content for presentation to the user. Content generated by an application may be in response to inputs received from the user via movement of the HMD 705 or the VR/AR haptic device 740. Examples of applications include: gaming applications, conferencing applications, video playback application, or other suitable applications.

The tracking module 750 calibrates the VR/AR system 700 using one or more calibration parameters and may adjust one or more calibration parameters to reduce error in determination of the position of the HMD 705 and/or the haptic device 740.

The tracking module 750 tracks movements of the HMD 705 using slow calibration information of the HMD 705 from the imaging device 735. The tracking module 750 determines positions of a reference point of the HMD 705 using observed locators from the slow calibration information and a model of the HMD 705. The tracking module 750 also determines positions of a reference point of the HMD 705 using position information from the fast calibration information of the HMD 705. Additionally, in some embodiments, the tracking module 750 may use portions of the fast calibration information, the slow calibration information, or some combination thereof of the HMD 705, to predict a future location of the headset 705. The tracking module 750 provides the estimated or predicted future position of the HMD 705 to the execution engine 755.

The execution engine 755 executes applications within the system environment 700 and receives position information, acceleration information, velocity information, predicted future positions, or some combination thereof of the HMD 705 from the tracking module 750. Based on the received information, the execution engine 755 determines content to provide to the HMD 705 for presentation to the user. For example, if the received information indicates that the user has looked to the left, the execution engine 755 generates content for the HMD 705 that mirrors the user's movement in a virtual environment. Additionally, the execution engine 755 performs an action within an application executing on the console 710 in response to detecting a motion of the haptic device 740 and provides feedback to the user that the action was performed. In one example, the execution engine 755 instructs the HMD 705 to provide visual or audible feedback to the user. In another example, the execution engine 755 instructs the haptic device 740 to provide haptic feedback including a perception of a user touching a virtual object.

In addition, the execution engine 755 receives position information, acceleration information, velocity information, predicted future positions, or some combination thereof of the haptic device 740 from the tracking module 750 and determines whether a virtual touch event occurred. A virtual touch event herein refers to an event of a user contacting a virtual object in a virtual space. For example, an image of a virtual object is presented to the user on the HMD 705. Meanwhile, the execution engine 755 collectively analyzes positions of multiple sensors of the haptic device 740 through the tracking module 750, and generates a three dimensional mapping of the haptic device 740 describing the position and the shape of the haptic device 740. The three dimensional mapping of the haptic device 740 describes coordinates of various parts of the haptic device 740 in a virtual space corresponding to physical positions of the parts of the haptic device 740 in reality. Responsive to the user performing an action to grab the virtual object or the user being contacted by the virtual object, the execution engine 755 determines that the virtual touch event occurred.

In one embodiment, the execution engine 755 compares coordinates of a virtual object and a coordinate of the haptic device 740 in a virtual space to determine whether a virtual touch event occurred. The execution engine 755 obtains a coordinate of the virtual object in a virtual space, in accordance with an image presented via the HMD 705. Additionally, the execution engine 755 obtains a coordinate of the haptic device 740 (e.g., haptic glove) corresponding to a physical position of the haptic device 740 from the tracking module 750 or the three dimensional mapping of the haptic device 740. Then, the execution engine 755 compares the coordinate of the virtual object in the virtual space and the coordinate of the haptic device 740 in the virtual space. For example, if two coordinates of the virtual object and the haptic device 740 overlap or are approximate to each other within a predetermined distance for a predetermined amount of time (e.g., 1 second), the console 710 determines the virtual touch event occurred.

In one embodiment, the execution engine 755 generates a haptic feedback signal to simulate a user touching a virtual object (i.e., provide a perception to a user that the user is touching an object). Responsive to detecting the virtual touch event, the execution engine 755 determines an amount of resistance to provide to the user. For example, if a user's finger is in touch with a virtual object, the execution engine 755 determines an amount of force of the user movement, based on the velocity or acceleration of the user movement. The velocity or acceleration of the user movement can be obtained, for example, according to the movement tracked by the tracing module 750. The execution engine 755 obtains a value of hardness of the virtual object in contact with the user finger, and compares the value of hardness with the determined force. In one example, responsive to determining that the force of the user movement is less than the value of hardness (or a threshold value) of the virtual object, the execution engine 755 determines that the user cannot bend the finger in a physical direction corresponding to a virtual direction through the virtual object. Responsive to determining that the force of the user movement is larger than the value of hardness (or the threshold value) of the virtual object, the execution engine 755 determines that the user can bend the finger in the physical direction corresponding to the virtual direction through the virtual object. In one example, the execution engine 755 determines that the user movement breaks the virtual object (e.g., egg), and determines to provide no resistance to the user movement. In another example, the execution engine 755 determines that the user movement deforms the virtual object (e.g., marshmallow), and determines to an amount of resistance corresponding to the deformation of the virtual object and the force of the user movement. The execution engine 755 determines a portion (e.g., a coordinate or a position) of the haptic device 740 to be actuated (e.g., inflated or deflated) and amount of actuation (e.g., a degree or amount of inflation). The execution engine 755 provides the haptic feedback signal indicating the portion of the haptic device 740 and the amount of actuation to the haptic device 740 for executing the haptic feedback.

Exemplary Flow for Haptic Feedback Using Sheet Jammer

Figure 8:
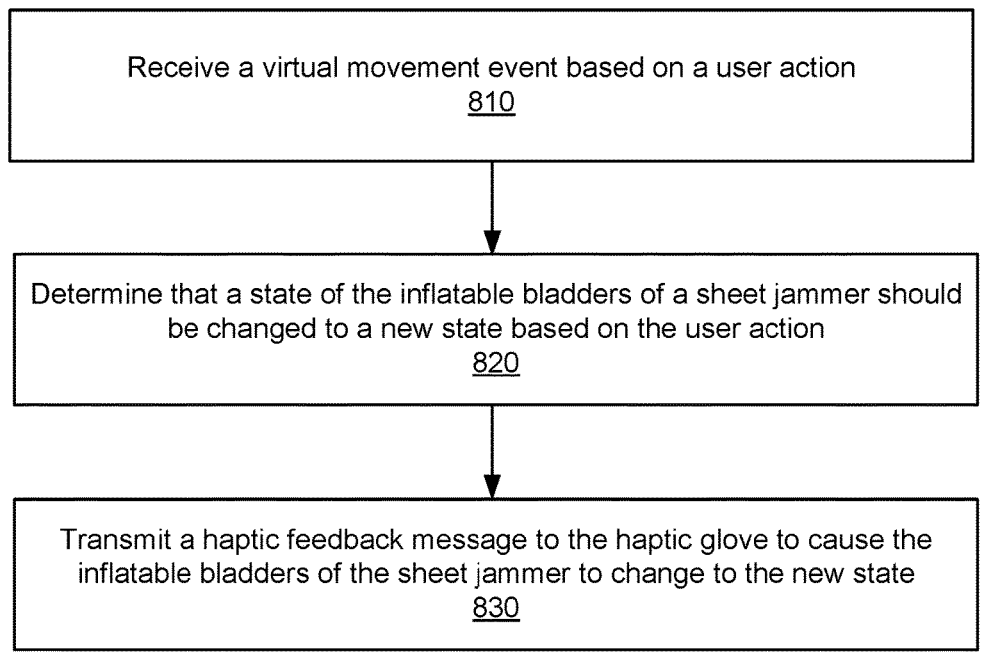
FIG. 8 is a flow chart illustrating a process of providing haptic feedback responsive to a virtual touch event in a virtual space, in accordance with an embodiment.

FIG. 8 is a flow chart illustrating a process of providing haptic feedback responsive to a virtual touch event in a virtual space, in accordance with an embodiment. In one embodiment, the process of FIG. 8 is performed by a console (e.g., console 710 of FIG. 7). Other entities may perform some or all of the steps of the process in other embodiments. Likewise, embodiments may include different and/or additional steps, or perform the steps in different orders.

The console receives 810 a virtual movement event based on a user action. In one embodiment, the console receives fast calibration data from the haptic device (as described above) and/or slow calibration data from the imaging device, and then determines that the user action is a hand movement. In one approach, the console obtains 3-D map of the user hand describing coordinates of various parts of the haptic glove in a virtual space corresponding to physical positions of the parts of the haptic glove in reality based on the fast calibration data and/or the slow calibration data. The console compares the coordinate of the virtual object in the virtual space and the coordinate of the haptic glove in the virtual space to determine whether a user action occurred.

Responsive to determining the user action occurred, the console determines 820 a state of the inflatable bladders of a sheet jammer of the haptic device (e.g., sheet jammer 110A and/or 110B) should be changed to a new state based on the user action. The system may support multiple states, which may correspond to different degrees of restriction, and may also correspond to different degrees of restriction at different locations of the haptic movement restriction structure. The different degrees of restriction may correspond to different amounts of inflation in the sheet jammer. For example, responsive to the user pressing a virtual object (e.g., a ball) in a virtual space with a bottom surface of an index finger, the console determines that a user action occurred, and identifies the bottom surface of the index finger is in contact with the virtual object. The console determines that the state of the sheet jammer should be set to a particular restriction level corresponding to a force that could be sensed by the user in response to touching the virtual object.

The console determines an amount of inflation for the inflatable bladders in response. For example, responsive to determining that the bottom surface of the index finger is in contact with the virtual object, the console determines the force of the hand movement and compares the determined force with the value of hardness of the virtual object in contact. Responsive to determining that the value of the hardness is greater than the force of the hand movement, the console determines that the index finger is not allowed to bend inward and also determines an amount of actuation of the haptic apparatus for preventing the inward movement of the index finger. This amount of actuation corresponds to an inflation value for all or some of the inflatable bladders of the sheet jammer. In one example, responsive to determining that the value of the hardness is less than the force of the hand movement, the console determines that the virtual object (e.g., glass) is shattered and also determines an amount of actuation of the haptic apparatus for providing no resistance, or an instant (e.g., temporary) resistance, to the inward movement. In another example, responsive to determining that the value of the hardness is less than the force of the hand movement, the console determines that virtual object (e.g., ball) should be deformed, and also determines an amount of actuation of the haptic apparatus for impeding (e.g., slowing or reducing a force of) the inward movement.

The console transmits 830 a haptic feedback message to the haptic device to cause the inflatable bladders of the sheet jammer to change to the new state. The haptic feedback message includes details of the haptic feedback to be provided, according to the amount of actuation determined, to the inflatable bladders of the haptic movement restriction structure. The haptic feedback message identifies the correct sheet jammer and an amount of actuation for the inflatable bladders.

The console may repeat the steps of 810 through 830 during operation of the VR/AR/MR system.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A sheet jammer device, comprising:
   a first jamming sheet having a first surface and a second surface opposite the first surface, a portion of the first surface is within a compression region, and the first jamming sheet is anchored to a haptic device;
   a first inflatable bladder that includes a first contact area within the compression region, the first contact area is adjacent to the portion of the first surface within the compression region, the first contact area configured to exert a first friction force against the portion of the first surface that is adjacent to the first contact area;
   a second jamming sheet having a third surface and a fourth surface opposite the third surface, a portion of the third surface is within the compression region and is adjacent to a portion of the second surface of the first jamming sheet within the compression area, and the second jamming sheet is anchored to the haptic device; and
   a second inflatable bladder that includes a second contact area that is adjacent to a portion the fourth surface of the second jamming sheet within the compression region, the second contact area configured to exert a second friction force against the portion of the fourth surface that is adjacent to the second contact area,
   wherein an amount of inflation of the first inflatable bladder and the second inflatable bladder controls the first friction force and the second friction force to restrict movement of the first jamming sheet relative to the second jamming sheet.

2. The device of claim 1, wherein the haptic device is a glove worn by a user and a finger unit of the glove includes a first anchor point that is anchored to the first jamming sheet and a second anchor point that is coupled to the second jamming sheet finger unit.

3. The device of claim 2, wherein the finger unit includes a dorsal surface and a palmer surface, and the sheet jammer device is positioned along the dorsal surface of the finger unit.

4. The device of claim 3, further comprising a second sheet jammer device positioned along the palmer surface of the finger unit.

5. The device of claim 2, wherein the finger unit includes a dorsal surface and a palmer surface that is opposite the dorsal surface, a first lateral surface that is opposite a second lateral surface, where the dorsal surface, the palmer surface, the first lateral surface and the second lateral surface together form the finger unit, and the sheet jammer device is positioned along the first lateral surface.

6. The device of claim 5, further comprising a second sheet jamming device that is positioned along the second lateral surface.

7. The device of claim 2, wherein the first inflatable bladder is fluidically coupled to a fluid transfer device located on the glove.

8. The device of claim 1, wherein a surface area of the first contact area is the same regardless of an amount of inflation of the first inflatable bladder.

9. The device of claim 1, wherein the first inflatable bladder is an oblong cylinder, with a height of the cylinder being at least equal to the width of the first jamming sheet, and the first contact area of the first inflatable bladder being on a curved surface of the first inflatable bladder.

10. The device of claim 1, wherein a layer of inextensible material is attached to a side of the first inflatable bladder opposite the first contact area.

11. The device of claim 1, wherein the first contact area and the second contact area are at least 100 mm$^2$ in area.

12. The device of claim 1, wherein each jamming sheet has a coefficient of friction of at least 0.34.

13. The device of claim 1, wherein the sheet jammer has a length of at least 35 mm and a width of at least 10 mm.

14. The device of claim 1, wherein the first inflatable bladder is an elliptical cylinder, with a height of the elliptical cylinder being equal to a width of the first jamming sheet, and the first contact area of the first inflatable bladder being on a curved surface of the first inflatable bladder.

15. A sheet jammer device, comprising:
   a first jamming sheet having a first surface and a second surface opposite the first surface, a portion of the first surface is within a compression region, and the first jamming sheet is anchored to a haptic device;
   a second jamming sheet having a third surface and a fourth surface opposite the third surface, a portion of the third surface is within the compression region and is adjacent to a portion of the second surface of the first jamming sheet within the compression area, and the second jamming sheet is anchored to the haptic device; and
   a brake mechanism that includes:
      a first contact area within the compression region and the first contact area is adjacent to the portion of the first surface within the compression region, the first contact area configured to exert a first friction force against the portion of the first surface that is adjacent to the first contact area, and
      a second contact area that is adjacent to a portion the fourth surface of the second jamming sheet within the compression region, the second contact area configured to exert a second friction force against the portion of the fourth surface that is adjacent to the second contact area.

16. The device of claim 15, wherein the first friction force and the second friction force restrict movement of the first jamming sheet relative to the second jamming sheet.

17. The device of claim 15, wherein the haptic device is a glove worn by a user and a finger unit of the glove includes a first anchor point that is anchored to the first jamming sheet and a second anchor point that is coupled to the second jamming sheet.

18. The device of claim 17, wherein the finger unit includes a dorsal surface and a palmer surface, and the sheet jammer device is positioned along the dorsal surface of the finger unit.

19. The device of claim 18, further comprising a second sheet jammer device positioned along the palmer surface of the finger unit.

20. The device of claim 17, wherein the finger unit includes a dorsal surface and a palmer surface that is opposite the dorsal surface, a first lateral surface that is opposite a second lateral surface, where the dorsal surface, the palmer surface, the first lateral surface and the second lateral surface together form the finger unit, and the sheet jammer device is positioned along the first lateral surface.

* * * * *